(12) United States Patent
D'Acquisto

(10) Patent No.: US 11,029,325 B2
(45) Date of Patent: Jun. 8, 2021

(54) WIND CHECK BOTTLE

(71) Applicant: Andrae D'Acquisto, Bellevue, IA (US)

(72) Inventor: Andrae D'Acquisto, Bellevue, IA (US)

(*) Notice: Subject to any disclaimer, the term of this patent is extended or adjusted under 35 U.S.C. 154(b) by 8 days.

(21) Appl. No.: 16/602,911

(22) Filed: Dec. 21, 2019

(65) Prior Publication Data

US 2020/0217872 A1    Jul. 9, 2020

Related U.S. Application Data

(60) Provisional application No. 62/917,934, filed on Jan. 8, 2019.

(51) Int. Cl.
*G01P 13/02* (2006.01)

(52) U.S. Cl.
CPC .................... *G01P 13/02* (2013.01)

(58) Field of Classification Search
CPC ........................................................ G01P 13/02
USPC ........................................................ 73/170.01
See application file for complete search history.

(56) References Cited

U.S. PATENT DOCUMENTS

| | | | |
|---|---|---|---|
| 5,186,118 A * | 2/1993 | Stinson ................. | A01M 31/00 116/214 |
| 5,901,490 A * | 5/1999 | Lush .................... | A01M 31/008 43/1 |
| 5,958,585 A * | 9/1999 | Meeks ................... | G01P 13/02 428/392 |
| 6,631,800 B1 * | 10/2003 | Keeven ................... | G01P 13/02 206/37 |
| 7,765,863 B1 * | 8/2010 | Woolsey ............... | G01P 13/0006 73/170.04 |
| 9,739,796 B2 * | 8/2017 | Ferrara, Jr. ............... | F22B 1/28 |
| 2003/0061983 A1 * | 4/2003 | Williamson ............. | G01P 5/00 116/200 |
| 2007/0186641 A1 * | 8/2007 | Anderson ................. | F41B 5/14 73/170.01 |

* cited by examiner

*Primary Examiner* — Nathaniel T Woodward

(57) ABSTRACT

The invention generally relates to a wind indicating device used for determining wind detection. The device comprises two chambers which can contain two different materials for determining the direction the wind is traveling and/or swirling. This is beneficial to hunters in pursuit of game animals.

9 Claims, 3 Drawing Sheets

WIND CHECK BOTTLE

FIELD OF THE INVENTION

The present invention relates to a wind check bottle having dual chambers.

BACKGROUND OF THE INVENTION

Testing for wind direction while hunting is a common practice when in pursuit of various types of game, especially those with a keen sense of smell. Knowing the wind direction allows the hunter to stay downwind of the game animal thus avoiding detection giving the hunter an advantage.

There are several wind checking devices known in the prior art. One comprises a small container or plastic bottle containing a light powder substance such as baking powder, chalk, corn starch and the like dispelled by hunters by squeezing said bottle or container. The dispelled powder floats and is carried by the air indicating wind direction. However, on still days with little wind, utilizing a floating solid powder is less than ideal.

A second method for determining wind direction is through use of light solid or semi-solid material such as milkweed or synthetic fibers such as cotton or wool. Again, as these materials are released, they are carried by the air indicating wind direction. This works better than powder on days with little direction and is ideal for determining thermal wind direction in mountainous regions.

A third method is depicted in U.S. patent application publication No. 2017/0261290, which utilizes visible smoke to determine wind direction. This device is battery powered and requires the generation of visible smoke which is both complicated and expensive.

It is an object of the invention to provide an improved dispenser for determining wind direction which is both easy to use and economical.

SUMMARY OF THE INVENTION

The invention generally relates to a wind indicating device useful for determining wind detection. The device comprises two chambers, wherein each chamber is adapted to contain a different wind checking material for determining the direction the wind is traveling and/or swirling. This is beneficial to hunters in pursuit of game animals.

DETAILED DESCRIPTION OF THE FIGURES

DETAILED DESCRIPTION OF THE INVENTION

The hunter understands that it is important to know the wind direction when pursuing game animals with a keen sense of smell. Knowing the wind direction allows the hunter to stay downwind of the game animal thus allowing the hunter to avoid detection thereby providing the hunter an advantage The dual wind detection device of the invention comprises two chambers or holding compartments. The chambers are separated from each other such that there is no contact between the chambers. The first chamber is adapted to hold a powder substance such as baking soda or corn starch wind-check material and the second chamber is specially adapted to accommodate a solid wind-check material such as milkweed or synthetic fibers such as cotton or wool. This allows the hunter to take advantage of both types of wind detecting substances in a single unit.

Figure 1:
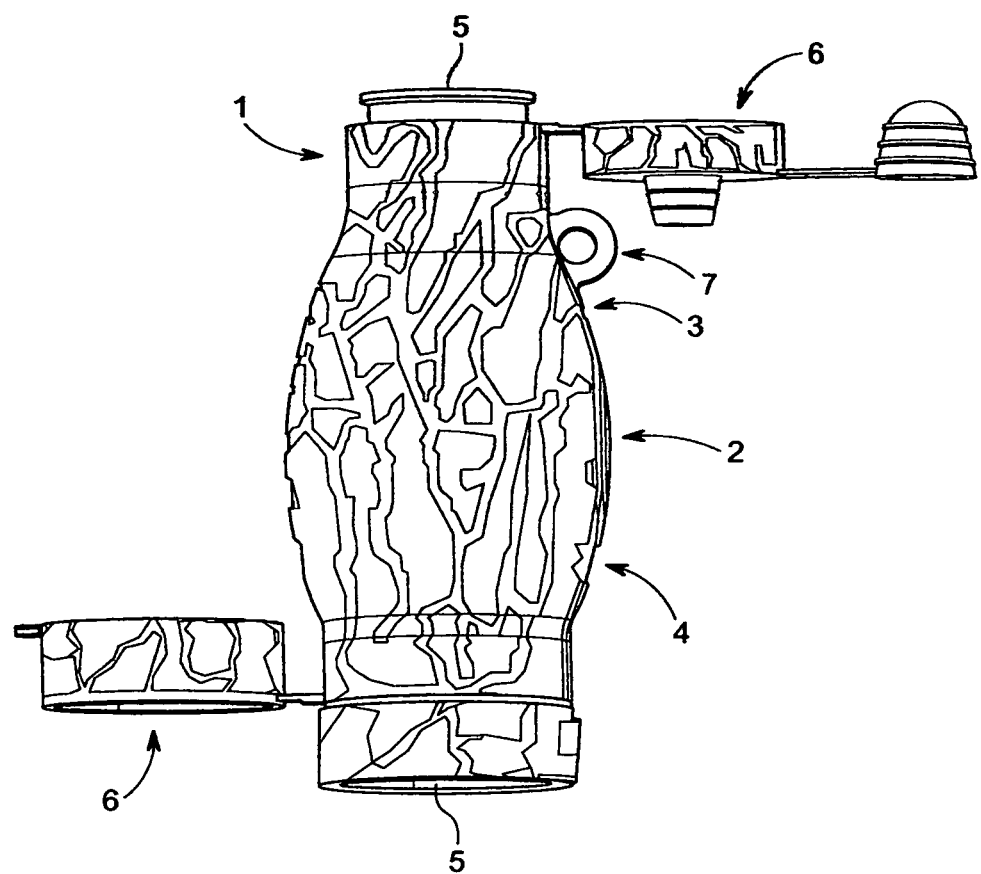
FIG. 1 shows an example of the wind checking device of the invention.

FIG. 1 shows an example wind indicating device 1 of the invention. The device 1 comprises a main body 2 that comprises a first chamber 3 and a second chamber 4, each having a separate port 5 for dispensing wind detecting material. Each port is provided with a cup shaped cover 6 to seal each chamber from the elements. Waterproofing can be accomplished through the use of O-rings and rubber gaskets (not shown) to seal each of the chambers from external moisture. The shape and size of the device can be varied to accommodate the needs of the hunter. The device 1 of the invention can be built to be standalone but have mounting capabilities. For example, the device 1 can kept in the hunter's pocket or the device can hang from the hunter's neck with a lanyard. The device can have a small U-shaped loop 7 to accommodate a lanyard or string. Alternatively, the device 1 can then be attached to a firearm or bow with universal attachments.

Figure 2:
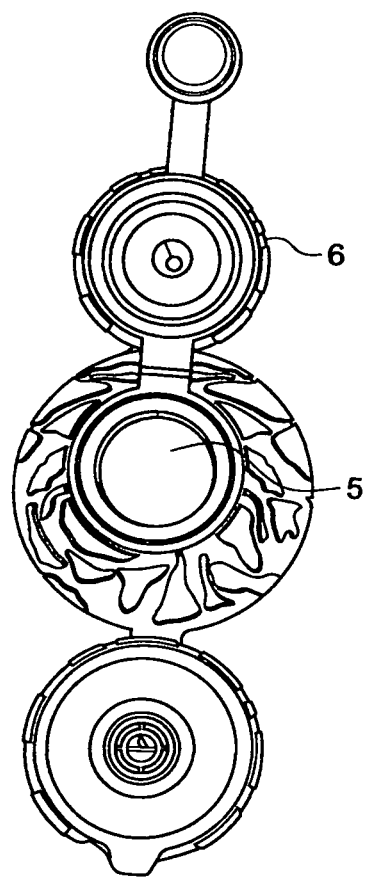
FIG. 2 shows the port and cap for dispensing the powdered wind detecting material.
Figure 3:
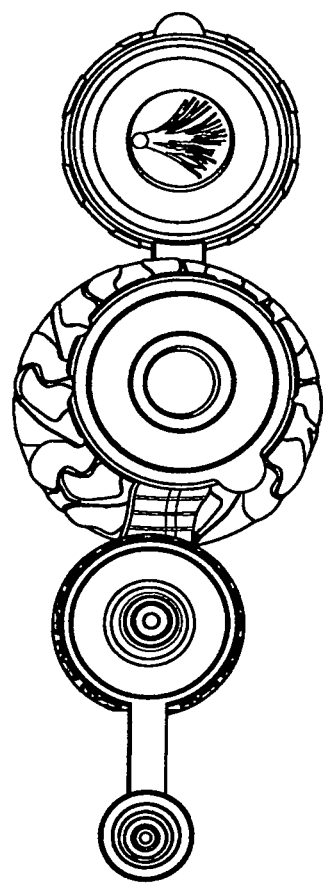
FIG. 3 shows the port and cap for dispensing the fiber-based wind checking material.

FIG. 2 depicts a top view of the first chamber of the device 1 of the invention while FIG. 3 shows a top view of the second chamber of the device 1.

The wind checking device of the invention can be of solid or flexible construction. In one embodiment the device is flexible and squeezable such that the user can squeeze said device to expel the solid wind-checking material. In another embodiment the wind checking device is made of a rubber type flexible material that is squeezable and optionally comprises a camo appearance.

The device of the invention can also be equipped with various other accessories including, but not limited to a wind string, compass, and the like.

Although specific embodiments of the disclosure have been described, numerous other modifications and alternative embodiments are within the scope of the disclosure. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments of the invention.

I claim:

1. A wind detecting device comprising a main body comprising two chambers; including a first chamber specially adapted for holding a powdered wind-checking material and a second chamber specially adapted for holding a solid fiber-based wind checking material.

2. The wind-checking device of claim 1 wherein said first chamber is adapted to hold a powdered wind-checking material substance selected from baking soda, chalk or corn starch and the second chamber is specially adapted to hold a solid fibrous wind checking material selected from milkweed, synthetic fibers, cotton fibers or wool.

3. The wind-checking device of claim 1 wherein each chamber comprises a port for dispensing a wind checking material.

4. The wind-checking device of claim 3 wherein each port comprises a cup shaped cap for sealing each chamber from the elements.

5. The wind-detecting device of claim 1 comprising a universal mount for mounting the wind detecting device to a firearm or to a bow.

6. The wind-checking device of claim 1 additionally comprising a U-shaped loop to accommodate a string or lanyard.

7. The wind checking device of claim 1 which additionally comprises a compass.

8. The wind-checking device of claim 1 wherein said first and second chambers are separated from each other by a barrier wall.

9. The wind-checking device of claim 1 wherein said device is squeezable to allow one to squeeze said device to expel said solid wind checking material.

* * * * *